(12) United States Patent
Mastuzawa et al.

(10) Patent No.: US 6,386,509 B1
(45) Date of Patent: May 14, 2002

(54) BACK PRESSURE CONTROL VALVE

(75) Inventors: Hironori Mastuzawa; Kimihito Sasao, both of Nagoya (JP)

(73) Assignee: Advance Denki Kougyou Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/628,437

(22) Filed: Jul. 28, 2000

(30) Foreign Application Priority Data

Sep. 29, 1999 (JP) .............................. 11-276942

(51) Int. Cl.[7] ...................... F16K 17/06; F16K 31/365
(52) U.S. Cl. ..................................... 251/61.3; 251/61.2
(58) Field of Search .................... 251/61.1, 61.2, 251/61.3, 61.4, 61.5

(56) References Cited

U.S. PATENT DOCUMENTS

| | | | | |
|---|---|---|---|---|
| 3,215,159 A | * | 11/1965 | Nixon ................... | 251/61.5 X |
| 4,504,214 A | * | 3/1985 | Stahl et al. ............ | 251/61.3 X |
| 4,544,328 A | * | 10/1985 | Credle, Jr. ............. | 251/61.3 X |
| 5,261,442 A | * | 11/1993 | Kingsford et al. ..... | 251/61.3 X |
| 5,967,173 A | * | 10/1999 | Kingsford et al. ..... | 251/61.3 X |

* cited by examiner

Primary Examiner—Joseph A. Kaufman
Assistant Examiner—John Bastianelli
(74) Attorney, Agent, or Firm—Rader, Fishman & Grauer, PLLC

(57) ABSTRACT

A back pressure control valve which accurately controls pressure of fluid on a primary side but is not affected by pressure variations on a secondary side. The back pressure control valve 10 has a first chamber 12, a second chamber 14, a flow path 16 with a valve seat 17, a valve mechanism 20 with a rod portion 21 with a valve portion 22, a first diaphragm 30 within the first chamber which is provided with a first pressure adjusting mechanism M1, and a second diaphragm 40 within the second chamber which is provided with a second pressure adjusting mechanism M2.

3 Claims, 7 Drawing Sheets

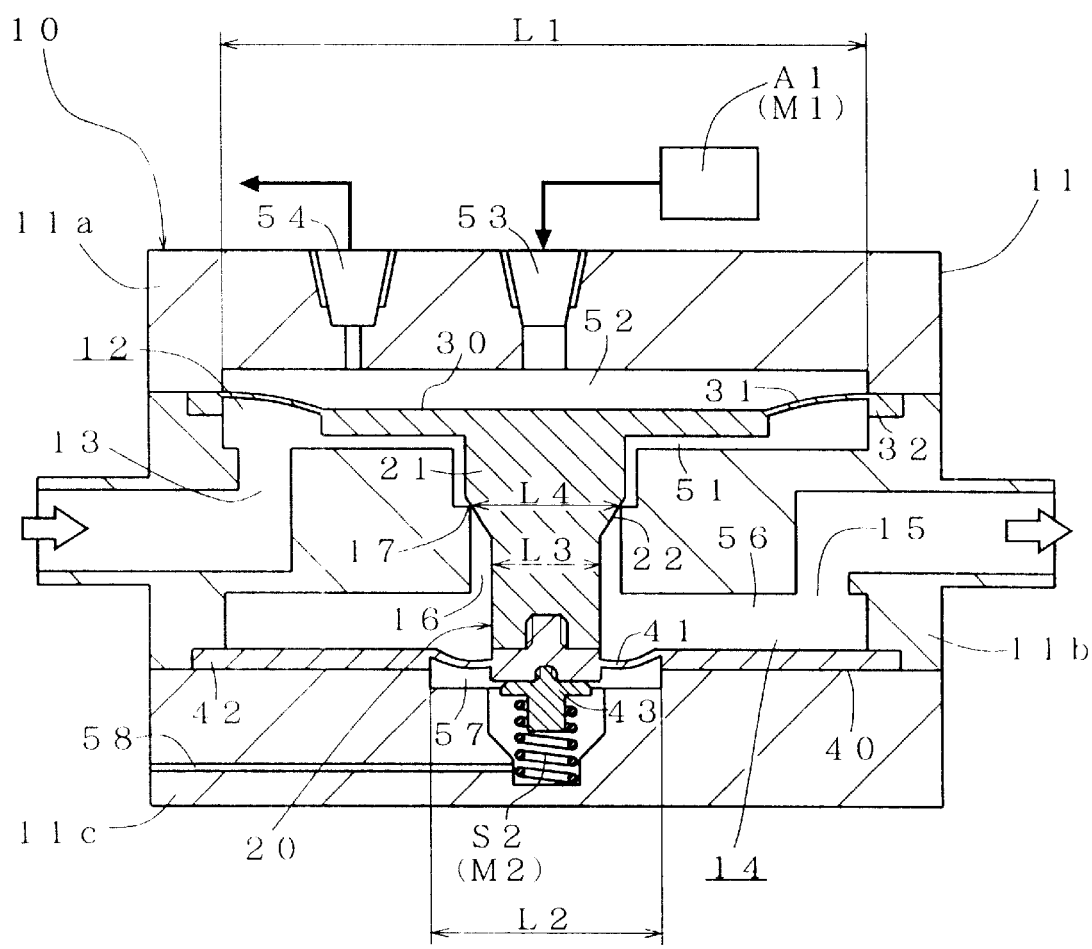
[Fig. 1]

[Fig. 2]
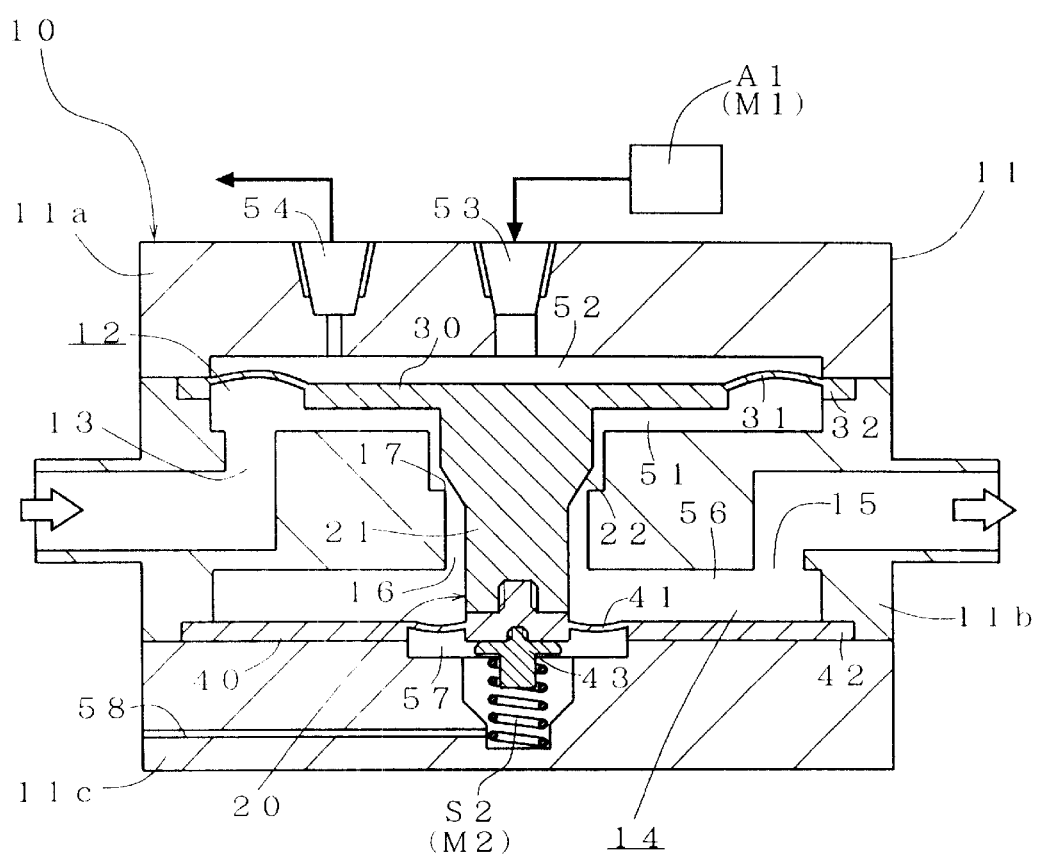

[Fig. 3]
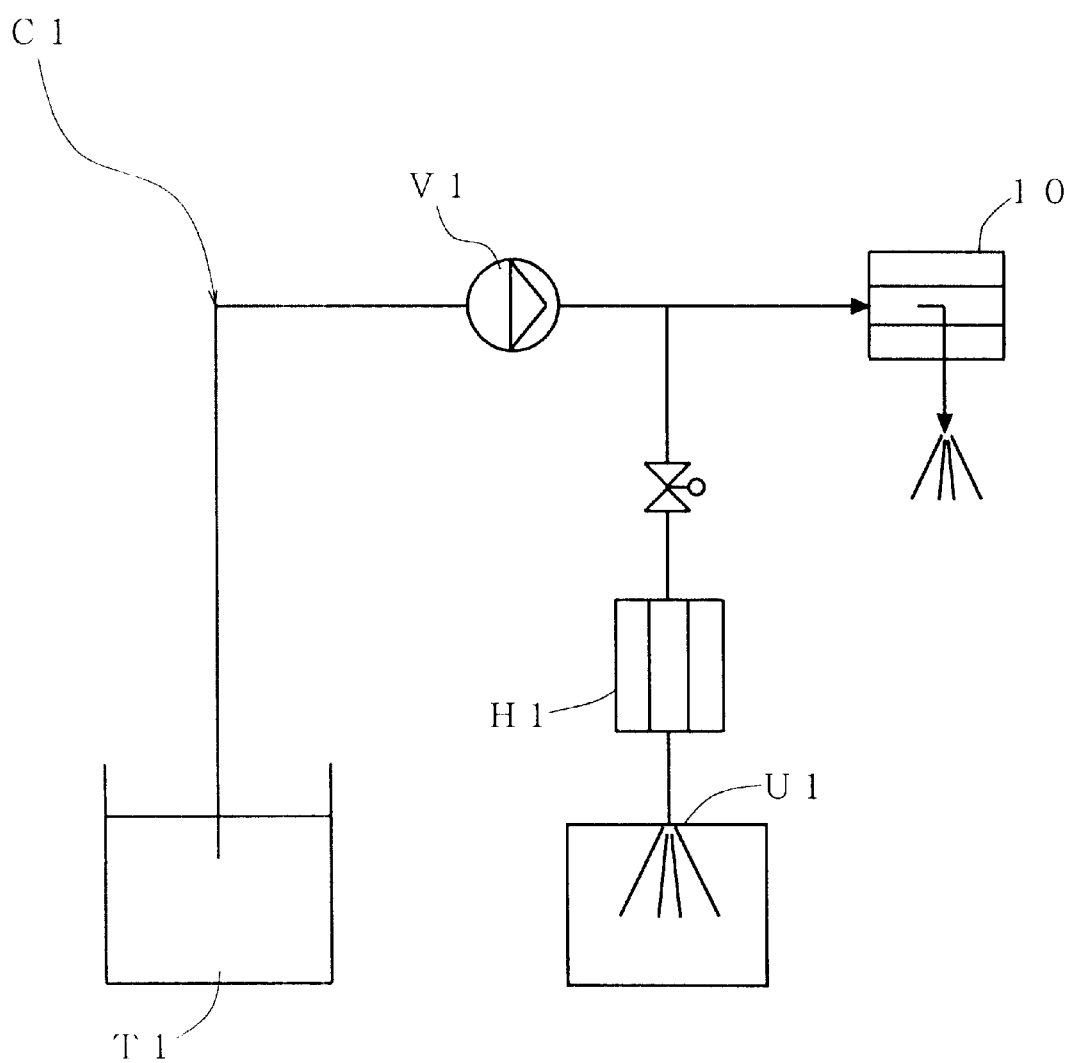

[Fig. 4]
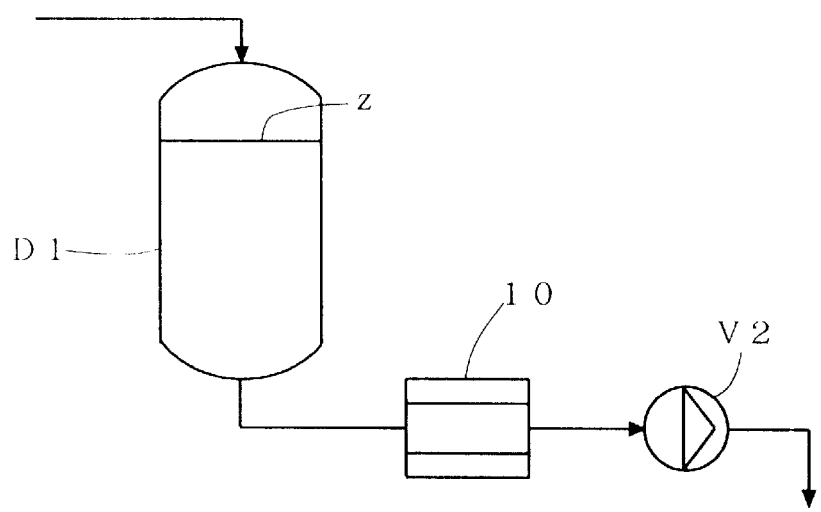
[Fig. 5]
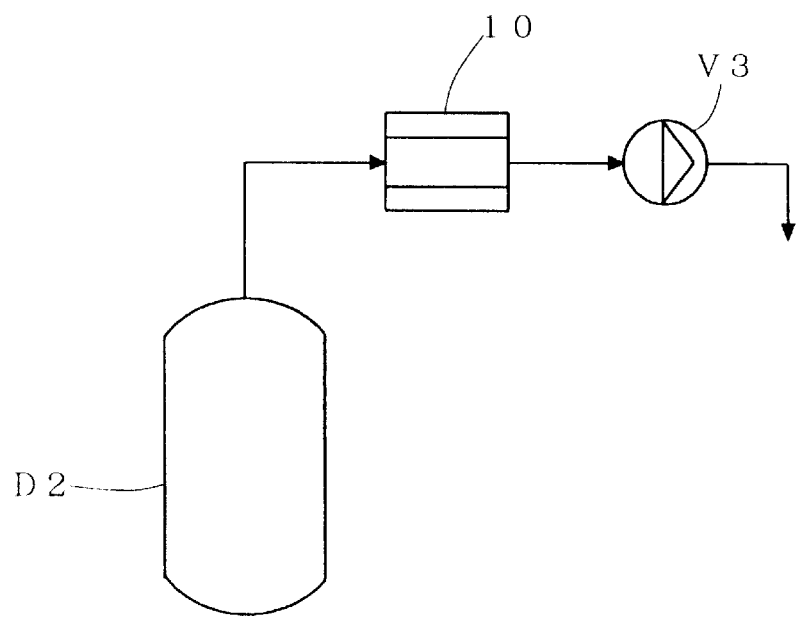

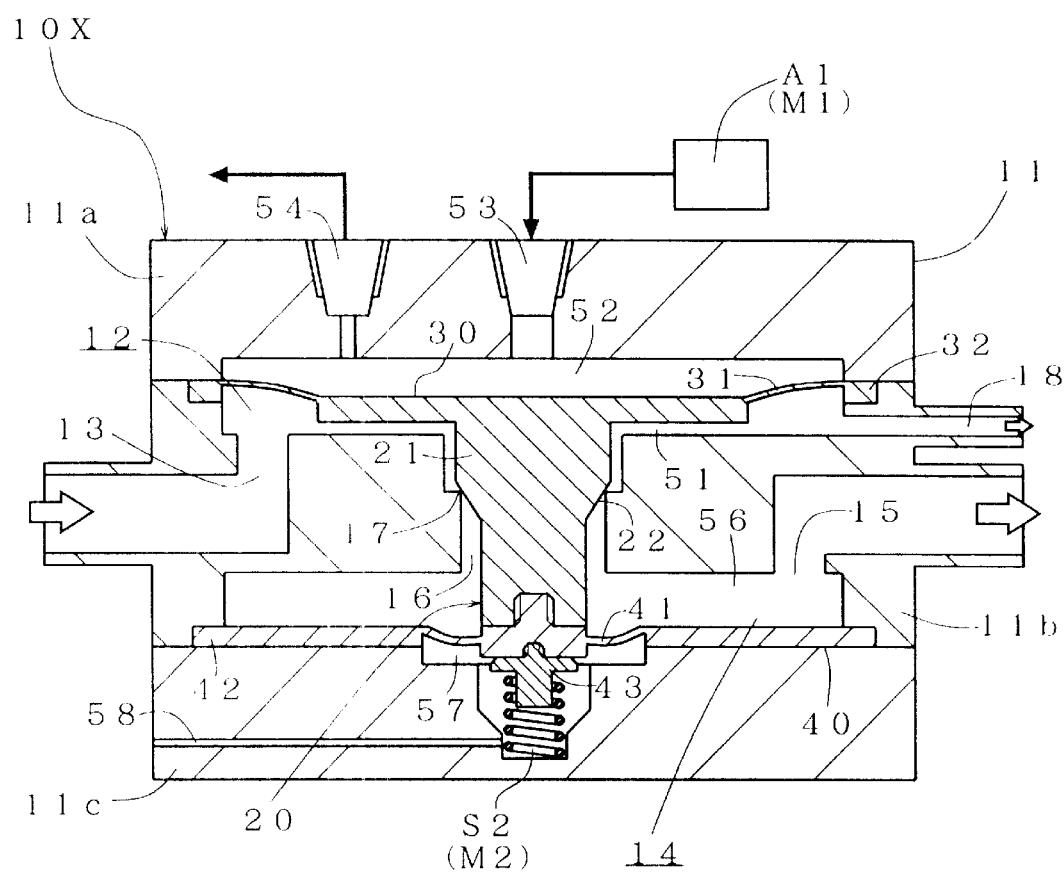
[Fig. 6]

[Fig. 7]
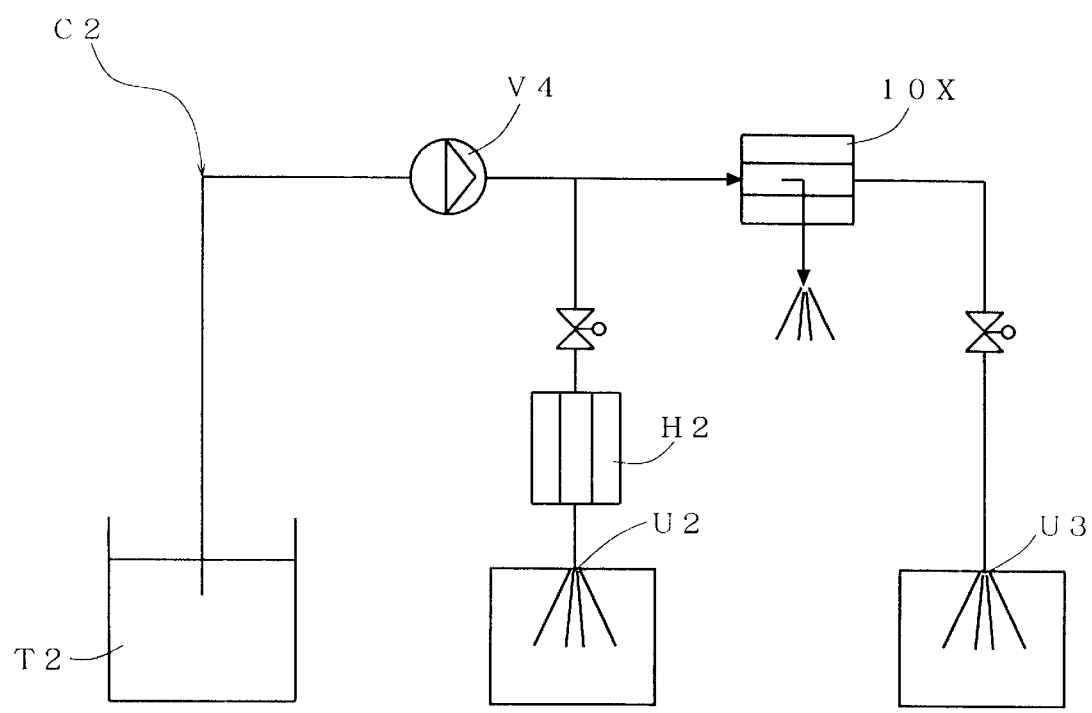

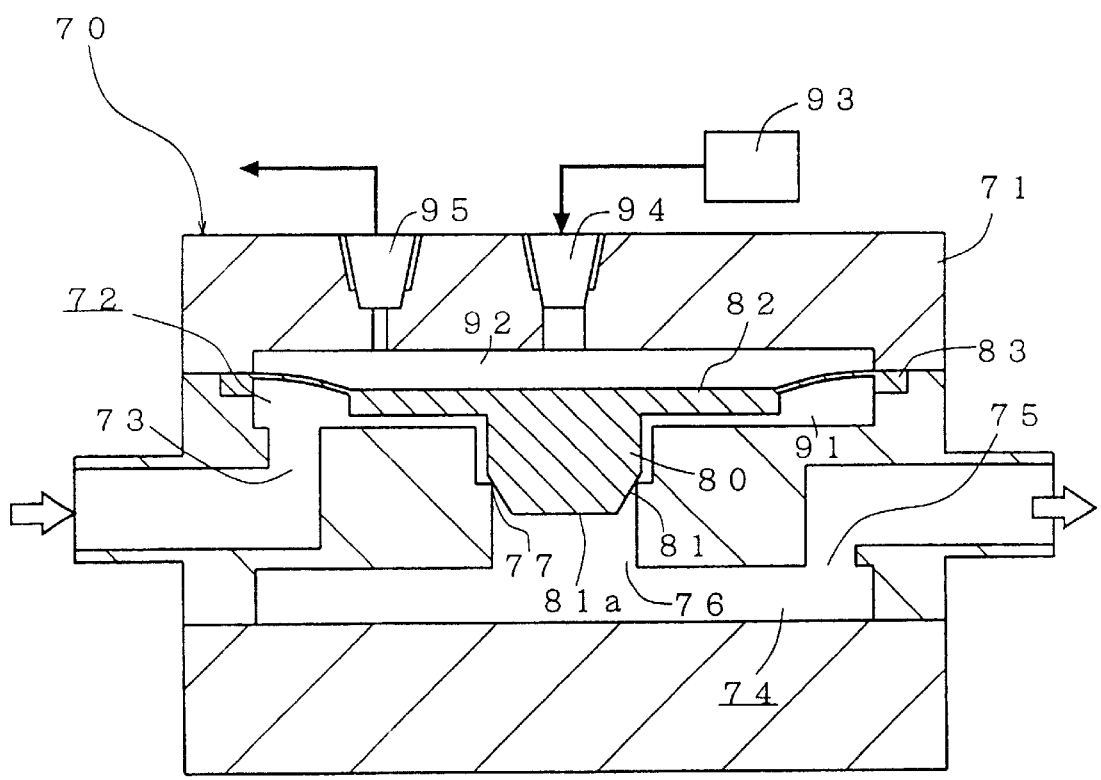
[Fig. 8]
PRIOR ART

BACK PRESSURE CONTROL VALVE

BACKGROUND OF THE INVENTION

1. Field of the Invention

The present invention relates to a back pressure control valve for controlling fluid (liquid or gas) on a primary side to be in a predetermined pressure condition.

2. Description of the Related Art

In manufacturing semiconductors, it was conventionally performed that for the purpose of keeping pressure of fluid constant at a use point utilizing agents or ultrapure water, a pressure adjusting valve 70 as shown in FIG. 8 is provided as a safety valve (relief valve) on a downstream side of the use point of a fluid circuit for controlling (or keeping) the fluid on a primary side (upstream side) of the pressure adjusting valve 70 to be in a predetermined pressure condition.

The above-described conventional pressure adjusting valve 70 is comprised of a body 71 including a first chamber having an inlet portion 73 for controlled fluid that is connected to the fluid circuit, a second chamber 74 having an outlet portion 75 for the controlled fluid, and a communicating flow path 76 for fluid communication between the first chamber 72 and the second chamber 74 and being formed with a valve seat 77, and further of a valve mechanism 80 including a valve portion 81 for opening and closing the valve seat 77 and being located on the first chamber 72 side of the communicating flow path 76, and a diaphragm portion 82 which is arranged within the first chamber 72, wherein an outer peripheral portion 83 of the diaphragm portion 82 is fixed to the body 71, and the first chamber 72 is divided into a valve chamber 91 including the inlet portion 73 inside the diaphragm portion and a pressure adjusting chamber 92 outside the diaphragm portion. In the pressure adjusting chamber 92, a pressure adjusting means 93 such as pressure adjusting gas (as used in this example of the drawing) or a spring adjusts a pressure of the diaphragm 82 to be a predetermined pressure to keep the diaphragm portion 82 in a predetermined direction (downward in the drawing, which is a direction of the valve chamber). In the drawing, reference numeral 94 designates a supply gas port for the pressure adjusting gas, while reference numeral 95 designates an exhaust port.

In the back pressure control valve 70, the pressure within the fluid circuit, that is, the fluid pressure on the primary side of the back pressure control valve 70 is received by the valve mechanism 80, while an opening degree of the valve seat 77 is controlled by balancing the fluid pressure on the primary side and the set pressure of the pressure adjusting means 93 for pressing the valve mechanism 80 so as to keep the fluid on the primary side in a predetermined pressure condition. More specifically, when pressurizing force of fluid acting on the valve mechanism 80 becomes larger than a pressurizing force of the pressure adjusting means 93, the valve mechanism 80 is moved towards the pressure adjusting chamber (upward in the drawing) to open the seat valve 77 such that the fluid within the fluid circuit is discharged. On the contrary, when the pressurizing force of the fluid acting on the valve mechanism 80 becomes smaller than the pressurizing force of the first pressure adjusting means 93, the valve mechanism 80 is moved towards the second chamber to close the valve seat 77 such that the amount of discharged fluid from the fluid circuit is reduced.

However, the conventional back pressure control valve 70 is not provided with any functions for coping with pressure variation on a secondary side (outlet portion side) accompanying variations in discharge flow rate or the like. Thus, influences caused by pressure variations on the secondary side (for example, limitations in movements of the valve mechanism 80 accompanying the variation) will be of concern. Especially, when the communicating flow path 76 of the body 71 is of large diameter, an area of a pressure-receiving surface 81*a* on the valve portion side of the valve mechanism 80 will become large so that influences of pressure variations on the secondary side will be remarkable. In addition, the back pressure control valve 70 was mainly used as a safety valve because it was not provided with any functions for coping with pressure variations on the secondary side. Further, when the pressure adjusting 93 is comprised by a spring in the back pressure control valve 70, hysteresis occurs at the time of operating the valve mechanism 80 to result in degradations in repetition accuracy, and a drawback was presented in that the pressure of fluid on the primary side could not be accurately controlled to be a predetermined pressure.

SUMMARY OF THE INVENTION

The present invention has been proposed in view of the problems described above, and is directed to provide a structure for a back pressure control valve which exhibits favorable repetition accuracy at the time of operating the valve mechanism, which is capable of accurately controlling pressure of fluid on a primary side (inlet side), and which is not affected by pressure variations on a secondary side.

Moreover, the present invention is further directed to provide a structure for a back pressure control valve enabling new embodiments thereof thanks to the above-described fact that the structure is not affected by pressure variations on the secondary side.

More particularly, the invention as recited in claim 1 of the present invention provides a back pressure control valve (10) for controlling fluid on a primary side to be in a predetermined pressure condition, comprising: a body (11) including a first chamber (12) having an inlet portion (13) for controlled fluid, a second chamber (14) having an outlet portion (15) for the controlled fluid, and a communicating flow path (16) for fluid communication between the first and second chambers and being formed with a valve seat (17), and a valve mechanism including a rod portion (21) with a valve portion (22) for opening or closing the valve seat and being positioned on the first chamber side of the communicating flow path, a first diaphragm portion (30) provided on one side of the rod portion and being arranged within the first chamber, and a second diaphragm portion (40) provided on the other side of the rod portion and being arranged within the second chamber, wherein an outer peripheral portion (32) of the first diaphragm portion is fixed to the body comprising the first chamber, the first chamber being divided into a first valve chamber (51) including the inlet portion inside the first diaphragm portion and a first pressure adjusting chamber (52) outside the first diaphragm portion, wherein an outer peripheral portion (42) of the second diaphragm portion is fixed to the body comprising the second chamber, the second chamber being divided into a second valve chamber (56) including the outlet portion inside the second diaphragm portion and a second pressure adjusting chamber (57) outside the first diaphragm portion, and wherein the first pressure adjusting chamber is provided with a first pressure adjusting means (M1) for adjusting a pressure of the first diaphragm portion to be a predetermined set pressure in a predetermined direction, while the second pressure adjusting chamber is provided with a second pressure adjusting means (M2) for adjusting a pressure of the second diaphragm portion to be a predetermined set pressure in a predetermined direction.

Further, the invention as recited in claim 2 of the present invention relates to the back pressure control valve of claim 1, wherein an effective diameter of the first diaphragm portion is set to be larger than an effective diameter of the second diaphragm portion.

Moreover, the invention as recited in claim 3 of the present invention relates to the back pressure control valve of claim 1 or 2, wherein an effective pressure-receiving area of the second diaphragm is set to be equal to an effective area of the valve seat.

BRIEF DESCRIPTIONS OF THE DRAWINGS

FIG. 1 is a longitudinal sectional view illustrating a closed condition of the back pressure control valve according to one embodiment of the present invention.

FIG. 2 is a longitudinal sectional view of an opened condition of the back pressure control valve shown in FIG. 1.

FIG. 3 is a schematic view illustrating one example for using of the back pressure control valve shown in FIG. 1.

FIG. 4 is a schematic view of another example for using the back pressure control valve shown in FIG. 1.

FIG. 5 is a schematic view of yet another example for using the back pressure control valve shown in FIG. 1.

FIG. 6 is a longitudinal sectional view of another embodiment of the back pressure control valve.

FIG. 7 is a schematic view of an example for using the back pressure control valve shown in FIG. 6.

FIG. 8 is a longitudinal sectional view of a conventional back pressure control valve.

DETAILED DESCRIPTION OF THE PREFERRED EMBODIMENTS

Now the present invention will be described in more details with reference to the accompanying drawings.

FIG. 1 is a longitudinal sectional view illustrating a closed condition of the back pressure control valve according to one embodiment of the present invention; FIG. 2 is a longitudinal sectional view of an opened condition of the back pressure control valve shown in FIG. 1; FIG. 3 is a schematic view illustrating one example for using of the back pressure control valve shown in FIG. 1.; FIG. 4 is a schematic view of another example for using the back pressure control valve shown in FIG. 1.; FIG. 5 is a schematic view of yet another example for using the back pressure control valve shown in FIG. 1.; FIG. 6 is a longitudinal sectional view of another embodiment of the back pressure control valve; and FIG. 7 is a schematic view of an example for using the back pressure control valve shown in FIG. 6.

A back pressure control valve 10 shown in FIGS. 1 and 2 relates to one embodiment of the present invention, and comprises a body 11 and a valve mechanism 20.

The body 11 is formed of resin with high corrosion and chemical resistance such as fluoroplastics, and is comprised of a first chamber 12 having an inlet portion 13 for controlled fluid, a second chamber 14 having an outlet portion 15 for the controlled fluid, and a communicating flow path 16 for fluid communication between the first chamber 12 and the second chamber 14 and being formed with a valve seat 17. In the communicating flow path 16, movements of the valve mechanism 20 (to be described later) cause variations in opening rates between a valve portion 22 of the valve mechanism 20 and the valve seat 17 to thereby control the flow rate of the controlled fluid flowing from a primary side (inlet portion 13 side) to a secondary side (outlet portion 15). As illustrated, the body 11 of the present embodiment is divided into a first block 11a, a second block 11b, and a third block 11c, wherein these blocks are assembled to be integral for comprising the body. If necessary, an orifice (not shown) of an appropriate diameter may be provided at the outlet portion 15.

Similar to the body 11, the valve mechanism 20 is formed of resin with high corrosion and chemical resistance such as fluoroplastics, and is comprised of a rod portion 21, a first diaphragm portion 30, and a second diaphragm portion 40. In the valve mechanism 20 of the present embodiment, the rod portion 21 and the diaphragm portion 30 are integrated, and the second diaphragm portion 40 is fixed to the rod portion 21 by screwing. Of course, the present invention is not limited to this arrangement, and it is alternatively possible to integrate the rod portion 21 and the second diaphragm portion 40 while the first diaphragm portion 30 is fixed to the rod portion 21 by screwing, to fix the respective portions by screwing, or to integrate all of the respective portions.

Now, each portion of the valve mechanism 20 will be described.

The rod portion 21 includes a valve portion 22 positioned on the first chamber 12 side of the communicating flow path 16 for opening and closing the valve seat 17. In this embodiment, a surface of the valve portion 22 is formed to be a tapered surface. With this arrangement, it is possible to prevent rapid fall in pressure when the seat valve 17 is opened. The rod portion 21 of the present embodiment is arranged in that its diameter on an upper end portion side thereof (first chamber side) is larger than its diameter on a lower end portion side thereof (second chamber side).

The first diaphragm portion 30 is formed at the upper end portion of the rod portion 21 and includes a thin movable portion 31 forming a diaphragm surface and an outer peripheral portion 32 on an outer peripheral side thereof. The second diaphragm portion 40 is formed at the lower end portion of the rod portion 21 and includes a thin movable portion 41 forming a diaphragm surface and an outer peripheral portion 42 on an outer peripheral side thereof.

The outer peripheral portion 32 of the first diaphragm portion 30 is fixed to the body 11 comprising the first chamber 12 and is arranged within the first chamber 12. In this embodiment, the outer peripheral portion 32 of the first diaphragm portion 30 is pinched and fixed between the first block 11a and the second block 11b, which comprise the body 11 as shown in the drawing. On the other hand, the outer peripheral portion 42 of the second diaphragm portion 40 is fixed to the body 11 comprising the second chamber 14 and is arranged within the second chamber 14. In this embodiment, the outer peripheral portion 42 of the second diaphragm portion 40 is pinched and fixed between the second block 11b and the third block 11c, which comprise the body 11, as shown in the drawing. Reference numeral 43 designates a spring seat portion for a spring S2 that serves as a second pressure adjusting means (to be described later) and that is engaged to the second diaphragm portion 40 with some suitable means such as screwing or fitting with play. Unless springs are used, the spring seat portion 43 is not necessary.

In this embodiment, an effective diameter of the first diaphragm portion 30 (outer diameter L1 of the thin movable portion 31) is arranged to be larger than an effective diameter of the second diaphragm portion 40 (outer diameter L2 of the thin movable portion 41). With this arrangement, sensitivity to pressure variations of fluid on the primary side can be improved.

Further, in this embodiment, an effective pressure-receiving area of the second diaphragm portion 40 is set to be equal to an effective area of the valve seat 17 of the communicating flow path 16. More particularly, the former area of the illustrated example is given by $[\pi/16 \times (L2+L3)^2 - \pi/4 \times (L3)^2]$ (wherein L2: outer diameter of the thin moveable portion 41, and L3: inner diameter (i.e. outer periphery of a small diameter portion of the rod portion 21) of the thin moveable portion 41), obtained by subtracting an area of a circle, which outer periphery is equal to the inner diameter L3, from an area of a circle which outer periphery is equal to an intermediate diameter of a midpoint of the outer diameter L2 and the inner diameter L3 of the thin moveable portion 41. The latter area of the illustrated example is given by $[\pi/4 \times (L4)^2 - /4 \times (L3)^2]$ (wherein L4: diameter of rod portion 21), which is an opening area between the valve seat 17 and the rod portion 21 (small diameter portion). With this arrangement, force acting in an outer direction (upward in this embodiment) from the controlled fluid to the valve portion 22 becomes equal to force acting in an outer direction (downward in this embodiment) from the controlled fluid to the second diaphragm portion 40 when the valve seat 17 is opened. Thus, even if pressure variations accompanying variations in discharge flow rate are generated on the outlet portion side 15, which is the secondary side, restrictions in movements of the rod portion 21 of the valve mechanism 20 caused by the pressure variation can be prevented (see equation (2) below). In other words, different from the known structure as described above in the column of DESCRIPTION OF THE RELATED ART, the valve mechanism will not be affected by pressure variations on the secondary side.

The first diaphragm portion 30 divides the first chamber 12 into a first valve chamber 51 and a first pressure adjusting chamber 52, while the second diaphragm portion 40 divides the second chamber 14 into a second valve chamber 56 and a second pressure adjusting chamber 57.

Now, each chamber will be described.

The first valve chamber 51 is positioned inside the first diaphragm portion 30 (lower side in the drawings), includes the inlet portion 13 of the controlled fluid, and is connected to the communicating flow path 16. The first pressure adjusting chamber 52 is comprised with a first pressure adjusting means M1, which is positioned outside the first diaphragm portion 30 (upper side in the drawing), for adjusting (which is affected by applying pressure in this embodiment) the pressure of the first diaphragm portion 30 in a predetermined direction, which is a direction of the first valve chamber in this embodiment (i.e. inward, or downward in the drawing), to be a predetermined set pressure (a first set pressure). The first pressure adjusting means M1 of this embodiment is comprised of pressure adjusting gas A1. When the pressure adjusting gas A1 is used as the first pressure adjusting means M1, it is easy to adjust the set pressure, and it is particularly useful when a large set pressure setting is required. It should be noted that while the first pressure adjusting means M1 applies pressure to the first diaphragm portion 30 in the direction of the first valve chamber in this embodiment, when the back pressure control valve 10 is used as a vacuum regulating valve as it will be described later, the first pressure adjusting means M1 may also be arranged to reduce pressure of the first diaphragm portion 30 in the direction of the first pressure adjusting valve (outward). In relation to the illustrated first pressure adjusting chamber 52, reference numeral 53 designates a supply gas port for the pressure adjusting gas, and 54 a corresponding exhaust port. A pressure adjusting device for gas is omitted in the drawing. Of course, a load-adjustable spring device or a solenoid can be used as the first pressure adjusting means M1.

Though not shown in the drawings, a check valve having a valve body with elasticity (flexibility) such as rubber may be provided for the supply gas port 53 of the first pressure adjusting chamber 52. With this arrangement, the check valve may prevent the controlled fluid from flowing back to the supply gas port 53 even if the first diaphragm portion 30 should be broken so that it is possible to prevent occurrence of faults and damages of a controller such as a solenoid valve or a pressure adjusting equipment that is connected to the supply gas side owing to back flow.

It is further possible to provide suitable throttling mechanisms such as throttle valves for adjusting a supply rate or discharge rate of the pressure adjusting gas at predetermined positions of a supply gas circuit (including the supply gas port 53) and an exhaust circuit (including the exhaust port 54) for the pressure adjusting gas A1 in the first pressure adjusting chamber 52.

The second valve chamber 56 is positioned inside the second diaphragm portion 40 (upper side in the drawing), includes the outlet portion 15 for the controlled fluid, and is connected to the communicating flow path 16. The second pressure adjusting chamber 57 is comprised with a second pressure adjusting means M2, which is positioned outside the second diaphragm portion 40 (lower side in the drawing), for adjusting (which is affected by applying pressure in this embodiment) the pressure of the second diaphragm portion 40 in a predetermined direction, which is a direction of the second valve chamber in this embodiment (i.e. inward, or upward in the drawing), to be a predetermined set pressure (a second set pressure). It should be noted that while the second pressure adjusting means M2 applies pressure to the second diaphragm portion 40 in the direction of the second valve chamber in this embodiment, when the back pressure control valve 10 is used as a vacuum regulating valve as it will be described later, the second pressure adjusting means M2 may also be arranged to reduce pressure of the second diaphragm portion 40 in the direction of the second pressure adjusting valve (outward).

In this embodiment, the second pressure adjusting means M2 is comprised of a spring S2, wherein the spring S2 has a predetermined spring constant and is fitted between a bottom of the second pressure chamber 57 and a spring seat portion 43 formed in the second diaphragm portion 40. When the second pressure adjusting means M2 is comprised by the spring S2 as in the above case, the structure will be simple and advantageous in terms of costs. Of course, the second pressure adjusting means M2 is not limited to the spring S2, and it is alternatively possible to employ pressure adjusting gas as in the first pressure adjusting means M1 (also including atmospheric release), to employ both of the spring and pressure adjusting gas, or to employ a solenoid (electromagnet). If only a spring is used, it is desirable to arrange it as a load-adjustable spring device in which a spring pressing member (not shown) is attached. It is further possible to connect a servomotor or the like to the load-adjustable spring device so as to control the spring constant automatically. In the drawing, reference numeral 58 designates a respiratory path for making air within the second pressure adjusting chamber 57 go out and come in.

Now, actions of the back pressure control valve 10 of the above-described structure will be explained.

In the back pressure control valve 10 of the above embodiment, the pressure adjusting means M1 and M2 of the first pressure adjusting chamber 52 and the second pressure adjusting chamber 57 apply the first set pressure and the second set pressure to the valve mechanism 20 in the direction of the valve chamber (i.e. inward) through the first diaphragm portion 30 and the second diaphragm portion 40. As shown in FIG. 3, when the back pressure control valve 10 is used as a safety valve (relief valve) downstream to an use point U1 in a fluid circuit C1, the first set pressure of the first pressure adjusting means M1 and the second set pressure of the second pressure means M2 (spring elastic force) are set to satisfy the following equation (1) (ultimately, equation (2)) in a normal condition as shown in FIG. 1, and the valve portion 22 of the valve mechanism 20 is positioned at the predetermined position, which is a position for closing the valve seat 17 in this example. Marks T1, V1, and H1 in FIG. 3 respectively designate a tank for the fluid, a pump, and a regulating valve (see Japanese Patent No. 2,671,183).

$$p1 \times s1 = p2 \times s2 + f + (p3 \times s3 - p3 \times s4) \tag{1}$$

In this equation, p1 designates the first set pressure of the first pressure adjusting means M1, p2 a primary side internal pressure of controlled fluid flowing from the inlet portion 13 to the first valve chamber 51 (a desired pressure of the controlled fluid), p3 a secondary side internal pressure of the controlled fluid flowing out from the outlet portion, s1 an area excluding the outer peripheral portion 32 on an upper surface of the first diaphragm portion 30, s2 an effective pressure-receiving area of the first diaphragm portion 30, s3 an effective area of the valve seat 17, s4 an effective pressure-receiving area of the second diaphragm portion 40, and f is a force of the second pressure adjusting means M2 acting on the second diaphragm portion 40. As described above, since the effective area s3 of the valve seat 17 is equal to the effective pressure-receiving area s4 of the second diaphragm portion 40 in this embodiment, the equation (1) may be transformed into the following equation (2):

$$p1 \times s1 = p2 \times s2 + f \tag{2}$$

The back pressure control valve 10 of the above-described arrangement will actuate in the following manner if any pressure variations in the controlled fluid should be present on the primary side: when the pressure of the controlled fluid has increased on the primary side, outwardly directed force applied on the inner surface of the first diaphragm portion 30 will overcome inwardly directed force applied on the outer surface of the first diaphragm portion 30 by the first pressure adjusting means M1, whereby the rod portion 21 of the valve mechanism 20 moves towards the first pressure adjusting chamber so that the valve seat 17 is opened and fluid within the fluid circuit C1 is discharged to the secondary side (outlet portion 15 side).

After the valve seat 17 is opened and the pressure of the controlled fluid decreases on the primary side, the outwardly directed force applied on the inner surface of the first diaphragm portion 30 falls lower than the inwardly directed force applied on the outer surface of the first diaphragm 30 by the first pressure adjusting means M1, whereby the rod portion 21 of the valve mechanism 20 moves towards the second chamber such that the valve seat 17 is closed and the discharge of fluid to the secondary side is reduced.

In this manner, the back pressure control valve 10 is capable of reducing pressure variations of controlled fluid on the primary side and of effectively keeping the controlled fluid on the primary side to be in the predetermined pressure condition. In addition, as the diaphragm portion 40 controls the balance of the pressure, hysteresis caused at the time of moving the rod portion 21, that is, at the time of opening and closing the valve seat 17 by actuating the first diaphragm portion 30 can be extremely decreased, and it is possible to improve the repetition accuracy during the operation of the valve mechanism 20. Further, as described above, if the effective pressure-receiving area of the second diaphragm 40 is made to be substantially equal to the effective area of the valve seat 17, influences owing to load variations on the secondary side can be eliminated so that the controlled fluid on the primary side can be more accurately controlled to be in the predetermined pressure condition.

Also, as the back pressure control valve 10 is arranged to prevent movements of the rod portion 21 of the valve mechanism 20 in accordance with load variations on the secondary side by setting the effective pressure-receiving area of the second diaphragm portion 40 equal to the effective area of the seat valve 17, it is possible to achieve novel embodiments of a back pressure control valve of a type as it will be described below.

In one example of an embodiment wherein the fluid (liquid in the drawing) stored in a container D1 is discharged from a pump V2 as illustrated in FIG. 4, the back pressure control valve 10 is provided between the container D1 and the pump V2 and a discharge flow rate from the container D1 is kept constant by the back pressure control valve 10. In this embodiment, the back pressure control valve 10 is set such that the first set pressure of the first pressure adjusting means M1 and the second set pressure of the second pressure adjusting means M2 (spring elastic force) satisfy the equation (2) and such that an opening rate (space) between the valve portion 22 of the valve mechanism 20 and the valve seat 17 is set to be a predetermined value when the valve 10 is in a normal condition. In this case, the pressure in the back pressure control valve 10 is negative. If it is possible to make the discharge flow rate from the container D1 constant as described above, the flow of liquid in the container D1 can be also made a laminar flow, which is very effective in manufacturing semiconductors. In addition, when the fluid in the container D1 is liquid, a liquid surface z in the container D1 can be advantageously controlled.

In FIG. 5, another embodiment of the back pressure control valve 10 is shown. In this example, for making an internal pressure of a container D2 negative by a vacuum pump V3, the back pressure control valve 10 is provided between the container D2 and the pump V3 to make the internal pressure of the container D2 negative. In other words, the back pressure control valve 10 can also be used as a so-called vacuum regulating valve.

FIG. 6 shows a back pressure control valve 10X of yet another embodiment according to the present invention. It should be noted that the same numerals and marks are used in the following explanations and in FIG. 6 for designating the same members as those of the back pressure control valve 10 explained before, and corresponding explanations are omitted.

In the back pressure control valve 10X of this embodiment, a second outlet portion 18 penetrating to outside of the body 11 is formed upstream of the valve seat 17 of the body 11. With this arrangement, stagnations on the first chamber 12 side can be eliminated when the valve seat 17 is in a closed condition.

In the back pressure control valve 10X of the above arrangement, it is possible to arrange a second use point U3 downstream of the second outlet portion 18 as in the example as illustrated in FIG. 7 wherein the back pressure control valve 10X is used as a safety valve. Mark C2 in FIG. 7 designates a fluid circuit, U2 a first use point, T2 a tank for the fluid, V4 a pump, and H2 a regulating valve (see Japanese Pat. No. 2,671,183).

As it has been illustrated and described above, the back pressure control valve according to the present invention performs balancing of pressure by the second diaphragm portion which pressurizes the valve mechanism from a direction opposite to a pressurizing direction of the first diaphragm portion, so that it is possible to remarkably reduce hysteresis caused during the operation of the valve mechanism, to improve the repetition accuracy at the time of operation, and to accurately control the pressure of the fluid on the primary side (inlet portion side). Further, since the back pressure control valve includes no sliding portions, no particles will be generated. Moreover, since the back pressure control valve may be manufactured by using materials of high erosion or chemical resistance only, the valve is highly applicable in case the controlled fluid is ultrapure water or chemicals.

In addition, in case the effective pressure-receiving area of the second diaphragm portion is made to be equal to the effective area of the valve seat, the accuracy of pressure control on the primary side can be further improved without being affected by load variations on the secondary side, and moreover, it is possible to develop quite novel embodiments, which had been sought to be impossible in such type of conventional back pressure control valves, so that convenience of such back pressure control valves can be highly improved.

What is claimed is:

1. A back pressure control valve (10) for controlling fluid on a primary side to be in a predetermined pressure condition, comprising:

a body (11) including
      a first chamber (12) having an inlet portion (13) for controlled fluid,
      a second chamber (14) having an outlet portion (15) for the controlled fluid, and
      a communicating flow path (16) for fluid communication between the first and second chambers and being formed with a valve seat, and a valve mechanism (20) including
      a rod portion (21) with a valve portion (22) for operating and closing the valve seat and being positioned on the first chamber side of the communicating flow path,
      a first diaphragm portion (30) provided on one side of the rod portion and being arranged within the first chamber, and
      a second diaphragm portion (40) provided on the other side of the rod portion and being arranged within the second chamber;

wherein an outer peripheral portion (32) of the first diaphragm portion is fixed to the body comprising the first chamber, the first chamber being divided into a first valve chamber (51) including the inlet portion inside the first diaphragm portion and a first pressure adjusting chamber (52) outside the first diaphragm portion, wherein an outer peripheral portion (42) of the second diaphragm portion is fixed to the body comprising the second chamber, the second chamber being divided into a second valve chamber (56) including the outlet portion inside the second diaphragm portion and a second pressure adjusting chamber (57) outside the second diaphragm portion, and wherein the first pressure adjusting chamber is provided with a first pressure adjusting means (M1) for adjusting the pressure of the first diaphragm portion to be a predetermined set pressure in a predetermined direction, while the second pressure adjusting chamber has a second pressure adjusting means (M2) for adjusting the pressure of the second diaphragm portion to be a predetermined set pressure in a predetermined direction.

2. The back pressure control valve according to claim 1, wherein an effective diameter of the first diaphragm portion is set to be larger than an effective diameter of the second diaphragm portion.

3. The back pressure control valve according to claim 1 or 2, wherein an effective pressure-receiving area of the second diaphragm is set to be equal to an effective area of the valve seat.

* * * * *

UNITED STATES PATENT AND TRADEMARK OFFICE
CERTIFICATE OF CORRECTION

PATENT NO.    : 6,386,509 B1
DATED         : May 14, 2002
INVENTOR(S)   : Hironori Matsuzawa and Kimihito Sasao It is certified that error appears in the above-identified patent and that said Letters Patent is hereby corrected as shown below:

<u>Title page,</u>
Item [75], Inventor, should read:
-- Hironori Matsuzawa; Kimihito Sasao both of Nagoya (JP) --

Signed and Sealed this

Twenty-fourth Day of December, 2002

JAMES E. ROGAN
*Director of the United States Patent and Trademark Office*